United States Patent Office 2,709,715
Patented May 31, 1955

2,709,715

SULFENYL HALIDE-POLYMER ADDITION PRODUCTS AND THEIR PREPARATION

Frank J. Heller, Bartlesville, Okla., assignor to Phillips Petroleum Company, a corporation of Delaware No Drawing. Application December 19, 1949,
Serial No. 133,953

20 Claims. (Cl. 260—761)

This invention relates to new compositions and their manufacture. In another embodiment this invention relates to the inter-reaction of polymeric materials with selected organic sulfenyl halides to produce new compositions having utility as rubber plasticizing agents.

An object of this invention is to provide new compositions and a process for their manufacture.

Another object is to provide novel rubber plasticizers.

Another object is to provide for the inter-reaction of a liquid polymeric material with an organic sulfenyl halide to form a new and novel composition.

It is still another object to provide for the inter-reaction of a material comprising a liquid polymeric diene, free from solid polymers, with a sulfenyl halide to produce a new and novel composition, having especial utility as a rubber plasticizer.

Other objects will be apparent to one skilled in the art from the accompanying discussion and disclosure.

In accordance with my invention, a material comprising a liquid polymer of a diene containing from 4 to 6 carbon atoms in the molecule, and free from solid polymers, is inter-reacted with a sulfenyl halide having the composition illustrated by a structural formula selected from the group consisting of R—S—X and R—S—S—X wherein in each formula R is an alkyl radical containing not more than 16 carbon atoms and X is a halogen selected from the group consisting of Cl and Br, to provide a novel, viscous liquid, or addition product, having utility as a rubber plasticizer.

The compositions of my invention when incorporated with natural or synthetic rubber serve to increase the pliability, and tack of the rubber, as well as to facilitate compounding it, by aiding in the dispersion of solids in the rubber being compounded, and are for these reasons particularly well applied as plasticizers for both synthetic and natural rubber.

When the novel compositions of my invention are employed as plasticizers in compounding natural or synthetic rubber, and the resulting rubber mix is vulcanized, they undergo vulcanization along with the rubber to become thoroughly incorporated in the vulcanizate. In this respect my compositions, as plasticizers, differ from petroleum or asphalt type plasticizers, widely used in rubber compounding, which are not vulcanizable and therefore remain as unconverted plasticizers in the vulcanizate. Vulcanizates containing my new compositions exhibit excellent tensile strength and elongation characteristics, and excellent hysteresis-flex life balance. Furthermore, the presence of these new compositions in the rubber mix being vulcanized, increases the scorch time, i. e. reduces the tendency of the rubber mix to undergo prevulcanization. Utility of my new compositions as regards milling and vulcanization of synthetic and natural rubber is further illustrated with reference to the examples herein.

It is a fundamental feature of my invention that the liquid polydiene reactant is not a rubber-like synthetic polymer, in any sense of the word, but rather it is a non-rubber-like liquid polymer free from solid polymers; it has a molecular weight within the limits of 500 to 4000. Those non-rubber-like polymers can be polymers of a conjugated diene alone, or copolymers of a diene with a minor proportion of a higher-boiling mono-olefin copolymerizable therewith and containing the group, $CH_2=C<$, such as styrenes, methyl substituted styrenes and the like. Suitable conjugated dienes from which these liquid polymer reactants can be made include primarily those having four to six carbon atoms per molecule, such as 1,3-butadiene, chloroprene, bromoprene, isoprene, dimethyl-butadiene, and the like. Mixtures of the conjugated dienes may also be employed.

The liquid non-rubber-like polymers employed in the process of my invention, may be produced by any suitable means. In one such preparation method, the polymer reactant can be prepared by solution polymerization in the presence of a finely divided alkali metal catalyst and a hydrocarbon solvent. In another method, the liquid polymer can be prepared by aqueous emulsion polymerization in the presence of relatively large amounts of mercaptan modifiers. In still another method, the liquid polymer can be produced in the presence of hydrofluoric acid as a catalyst.

When employing emulsion polymerization, the polymer reactant is prepared in the presence of a sufficiently large amount of modifier, such as 3 to 10 parts by weight of an alkyl mercaptan, per 100 parts of monomers, to provide a liquid polymer having the characteristics discussed above.

One method of preparing the polymer reactant by solution polymerization is disclosed in copending application, Serial No. 67,098, of W. W. Crouch, filed December 23, 1948, now U. S. Patent No. 2,631,175, issued March 10, 1953. In the procedure referred to in that copending application a conjugated diene of about 98 per cent purity, or higher, is polymerized in the presence of a finely divided alkali metal catalyst and a suitable diluent, under carefully controlled reaction conditions, particularly temperature, catalyst condition and concentration, quantity of solvent, and rate of diene addition. The polydiene thus produced is a substantially colorless, transparent liquid which is free from dissolved or suspended solid polymers, and has an average molecular weight of from 500 to 4000. The viscosity of the liquid polydiene is in a large part directly proportional to the selected particle size of the catalyst. Reaction temperatures employed are generally within the limits of about 60 to 110° C. The time required to carry out the polymerization, exclusive of the initial induction period, does not generally exceed eight hours and is preferably below four hours.

When employing hydrofluoric acid as a catalyst, a polydiene reactant of the type discussed herein can be prepared by mass polymerization, conducted in an inert solvent, at a temperature within the limits of about —110° F. to 20° F. This method is discussed in detail in the copending application of J. C. Hillyer and J. F. Wilson, Serial No. 53,995, filed October 11, 1948, now U. S. Patent No. 2,550,695, issued May 1, 1951.

While the preparative methods above discussed have been described in terms of the production of liquid polydiene, they are also applicable to other polymerizations in which a conjugated diene is the essential ingredient. For example, they are applicable to the polymerization of a conjugated diene with higher-boiling materials copolymerizable therewith, such materials including vinyl compounds as styrene, methyl substituted styrenes, and the like. In all such polymerizations, the major polymerizable ingredient is a conjugated diene, and this component is present in an amount which exceeds 50 weight per cent of the monomeric material.

The sulfenyl halide reactants employed in the process of my invention can be prepared by any suitable method. One method for the preparation of these reactant materials is described in the copending application of C. M. Himel, Serial No. 89,475, filed April 25, 1949, now forfeited, and in copending application of C. M. Himel, Serial No. 387,386, filed October 21, 1953. In accordance with the procedure in the latter copending application, a compound selected from the group consisting of alkyl mercaptans and dialkyl sulfides expressed as RSH and RSSR respectively, wherein R is an alkyl group, is reacted with a halogen to produce the corresponding halide. As an inert solvent in this preparative procedure, single paraffin hydrocarbons, or paraffin hydrocarbon mixtures can be utilized. Preferred paraffin hydrocarbon solvents are those having from 5 to 6 carbon atoms in the molecule, such as isopentane, normal pentane, normal hexane and the like. Chlorinated hydrocarbon solvents such as chloroform, carbon tetrachloride and the like can be used. Still lower boiling paraffin solvents can be advantageously employed when utilizing a reaction temperature as low as −30° C. or lower.

The sulfenyl halide reactants employed in the practice of my invention are advantageously handled in solution with a solvent of the type above discussed, since they are highly active materials, particularly when in a state of high purity. It is thus advantageous to employ the resulting reaction product mixture of a sulfenyl halide preparative procedure employing a solvent, such as that described above, as the sulfenyl halide reactant material in the process of my invention. However, it is entirely within the scope of my invention to employ sulfenyl halide reactant materials in any desired state of purity.

Included among the various sulfenyl halide reactants that can be utilized in the practice of my invention are tert-butylsulfenyl chloride, tert-butylthiosulfenyl chloride, secondary octylsulfenyl chloride, secondary dodecylsulfenyl chloride, tert-amylsulfenyl chloride, tert-amylthiosulfenyl chloride, n-butylsulfenyl chloride, n-hexylsulfenyl chloride, ethylsulfenyl chloride, isopropylsulfenyl chloride, tert-butylsulfenyl bromide, tert-butyl thiosulfenyl bromide, secondary octylsulfenyl bromide, secondary dodecylsulfenyl bromide, tert-amylsulfenyl bromide, tert-amylthiosulfenyl bromide, ethylsulfenyl bromide, isopropylsulfenyl bromide, n-butylsulfenyl bromide, n-hexylsulfenyl bromide.

In the preparation of my new compositions, I introduce the sulfenyl halide into reaction with the polymer at a reaction temperature preferably within the limits of 0 to 30° C., although higher or lower temperatures may be employed if desired. At temperatures higher than 30° C. an undesirably large amount of decomposition of the halide generally takes place, and at temperatures below 0° C. the reaction rate is often so slow as to be impractical. The ratio of sulfenyl halide to polymer introduced into the reaction is generally limited to not more than one mole per diene unit in the polymer reactant, i. e. the maximum proportion of halide introduced would be a number of moles equal to the number of diene units in the total polymer in the reaction zone. For reasons of practicability a lowermost proportion of a sulfenyl halide introduced into the reaction is generally about 0.02 mole per diene unit, although lesser proportions can be used if desired. For the manufacture of my compositions as plasticizers, 0.05 mole sulfenyl halide reactant per diene unit is generally the minimum proportion employed. Reaction time in the preferred temperature range is generally within the range of 0.5 to 24 hours, and pressures employed are sufficiently high to maintain the reaction mixture in liquid phase. Preferably, the sulfenyl halide reactant is dissolved in a solvent therefor, of the type discussed hereinabove. If desired, the liquid polymeric reactant can be dissolved in a suitable solvent, chemically inert under the reaction conditions employed. Such suitable solvents include carbon tetrachloride, chloroform, and glacial acetic acid.

The polymer-halide reaction is exothermic and the rate of introducing halide into reaction with polymer is necessarily controlled to prevent development of temperatures exceeding the desired operating temperature with concomitant undesirable halide decomposition.

The inter-reaction of halide with polymer is complete under the conditions of the process of my invention. Accordingly my compositions contain the halide chemically combined with the polymer in proportions the same as those of the halide and polymer, introduced into the reaction.

In the practice of a preferred embodiment of my invention, a solution of a sulfenyl halide reactant, in a liquid paraffin hydrocarbon having 5 to 6 carbon atoms in the molecule, containing the halide in a concentration of from about 1 mole per 100 to 1000 ml. of total solution, is added at a controlled rate to a solution of liquid polymer in a solvent substantially chemically inert under the polymer sulfenyl halide reaction conditions, such as glacial acetic acid, chloroform, or carbon tetrachloride, or the like; the polymer solution containing polymer generally in a concentration of about 1 gram polymer per 2 to 10 grams of solution. The amount of halide reactant introduced into the reaction mixture does not exceed more than one mole sulfenyl halide per diene unit in the polymer reactant. The reaction mixture is maintained at a temperature within the limits of 0 to 30° C., under a constant state of agitation during the reactant addition period, and for a period thereafter as long as from 20 to 23 hours. The total reaction time, i. e., the total time including the reactant addition period, is generally from 0.5 to 24 hours. The solvents are removed from the resulting reaction mixture, generally by distillation. The product thus recovered is a viscous liquid, comprising a sulfenyl halide-polydiene adduct, i. e. an addition product of the reactant materials, generally from red to brown in color.

Advantages of this invention are illustrated by the following examples. The reactants and their proportions and the other specific ingredients illustrated are presented as being typical and should not be construed to limit the invention unduly.

*Example I*

A solution of 0.5 mols tert-butylsulfenyl chloride in 400 ml. of isopentane was added dropwise to a solution of 40 grams liquid polybutadiene, free from solid polymers, in 185 ml. of chloroform, at a rate to maintain the temperature of the resulting admixture within the limits of from 15–20° C. The admixture was stirred during the addition of the sulfenyl chloride and for a period thereafter, the total stirring period being 12 hours. A reddish-brown product of reaction was formed during the 12-hour period, and was recovered upon removal of the isopentane and chloroform solvents from the reaction mixture. Analysis of the product thus obtained showed a sulfur content and chlorine content of 16.5 and 12.15 per cent respectively, on a weight basis.

*Example II*

A solution of 0.5 mol tert-butylsulfenyl chloride containing a minor proportion of tert-butyl-thiosulfenyl chloride as an impurity in 400 ml. of isopentane, was added dropwise to a solution of 40 grams liquid polybutadiene, free from solid polymers, in 185 ml. of glacial acetic acid, at a rate to maintain the temperature of the resulting admixture within the limits of from 15–20° C. The admixture was stirred during the addition of the sulfenyl chloride solution and for a period thereafter, the total stirring period being 12 hours. A reddish-brown product of reaction was formed during the 12-hour period, and was recovered upon removal of the isopentane and glacial acetic acid from the reaction mixture. Analysis of the product thus obtained indicated a sulfur content and chlorine content of 19.17 and 9.07 per cent respectively, on a weight basis.

Example III

A tertiary-butylsulfenyl chloride-polybutadiene composition was prepared by the dropwise addition of a solution of 3 mols tertiary-butylsulfenyl chloride in 800 ml. isopentane, to a solution of 324 grams liquid polybutadiene (equivalent to 6 mols butadiene) in 15 ml. chloroform. The temperature was held at 15 to 20° C. for twelve hours while the reaction mixture was stirred. An 82 per cent yield of product, based on total reactants was obtained upon removal of the solvent. This material is hereinafter referred to as composition A.

The procedure for the preparation of composition A was repeated except that 486 grams liquid polybutadiene was employed (equivalent to 9 mols butadiene). A 98 per cent yield of product was obtained. This material is hereinafter referred to as composition B.

Three batches of natural rubber (smoked sheet) were compounded according to the following recipe using as softeners the above described compositions, A, and B, and a known asphalt type rubber softener, referred to hereafter as composition C:

| | Parts by weight |
|---|---|
| Smoked sheet | 100 |
| Carbon black [1] | 50 |
| Zinc oxide | 5 |
| Stearic acid | 3 |
| Sulfur | 2.5 |
| N-cyclohexyl-2-benzothiazolesulfenamide | 0.5 |
| Softener (A, B, C) | 3 |
| Antioxidant [2] | 1 |

[1] A special furnace-type high modulus carbon black.
[2] Thermoflex A. Compositions: 50 per cent phenyl-beta-naphthylamine, 25 per cent p,p'-dimethoxy diphenylamine, 25 per cent diphenyl-p-phenylamine diamine.

The mixes were milled and cured at 307° F. for varying lengths of time. A summary of physical properties of the vulcanizate at equal states of cure is tabulated as follows.

| | Tertiary-Butylsulfenyl Chloride-Polybutadiene Compositions | | Asphaltic Flux |
|---|---|---|---|
| | A | B | [2] C |
| Compounded Mooney, MS 1½ | 43 | 43 | 43 |
| Minutes cure to 17.5% compression set [1] | 30 | 27 | 25 |
| Stress-strain properties at 80° F.: | | | |
| 300% modulus, p. s. i. | 1,940 | 2,015 | 1,960 |
| Tensile, p. s. i. | 3,740 | 3,870 | 3,990 |
| Elongation, percent | 500 | 500 | 500 |
| Stress-strain properties at 200° F.: | | | |
| Tensile, p. s. i. | 2,770 | 2,820 | 3,040 |
| Elongation, percent | 605 | 590 | 610 |
| Hysteresis, Δ T° F. | 41.4 | 41.0 | 39.8 |
| Resilience, percent | 73.0 | 72.2 | 73.4 |
| Flex life at 210° F., percent broken at 50,000 flexure | 18 | 15 | 14 |
| Minutes to scorch at 250° F. | 14.5 | 13.75 | 11.5 |

[1] Compression set is a measure of the state of cure.
[2] Asphaltic softener, known commercially as "Paraflux."

As demonstrated herein the compositions of my invention, when employed as rubber softeners, provide vulcanizates of excellent physical characteristics as regards stress-strain properties, hysteresis, resilience, and flex life balance, and provide particularly for superior scorch properties.

Reasonable variation and modification are possible within the scope of the foregoing disclosure and the appended claims to the invention, the essence of which is that there has been provided (1) a method for the preparation of halide-polymer adducts exhibiting marked utility as rubber plasticizers, comprising reacting a liquid polymer of a diene with an alkyl sulfenyl halide and/or an alkyl thiosulfenyl halide, (2) polymer-halide adducts so produced, and (3) rubber compositions containing such adducts as described.

I claim:

1. As a new composition, the addition product of a liquid polymer free from solid polymers and comprising a polymer of diene containing from 4 to 6 carbon atoms in the molecule, and a sulfenyl halide having the composition illustrated by a structural formula selected from the group consisting of R—S—X and R—S—S—X, wherein in each said formula R is an alkyl radical containing not more than 16 carbon atoms and X is a halogen selected from the group consisting of Br and Cl, said composition containing said halide combined with said polymer in a proportion not greater than 1 mole for each diene unit therein.

2. The composition of claim 1 wherein said liquid polymer consists of polymerized butadiene.

3. A new composition of matter, comprising an addition product of a liquid polymer of 1,3-butadiene, free from solid polymers and having a molecular weight within the limits of 500–4000, and tertiary-butylsulfenyl chloride, said composition containing said chloride combined with said polymer in a proportion of from 0.05 to 1 mole for each butadiene unit therein.

4. A process comprising reacting a sulfenyl halide having a structural formula selected from the group consisting of R—S—X and R—S—S—X wherein in each formula R is an alkyl radical containing not more than 16 carbon atoms and X is a halogen selected from the group consisting of Br and Cl, with a liquid polymeric material free from solid polymers and comprising a polymer of a conjugated diene containing from 4 to 6 carbon atoms in the molecule, in an amount of said sulfenyl halide not exceeding 1 mole per diene unit in said polymer, and recovering an addition product of said polymer and said sulfenyl halide from the resulting reaction mixture as a product of the process.

5. The process of claim 4 wherein said liquid polymer consists of polymerized 1,3-butadiene.

6. A process for reacting a polymeric material with a sulfenyl halide to produce a resulting addition product suitable for use as a rubber plasticizer, comprising admixing a sulfenyl halide having a structural formula R—S—X wherein R is an alkyl radical containing not more than 16 carbon atoms in the molecule and X is a halogen selected from the group consisting of chlorine and bromine, with a liquid polymer of a conjugated diene containing from 4 to 6 carbon atoms in the molecule in an amount not exceeding 1 mole of said halide per diene unit in said polymer, maintaining the resulting admixture at a temperature within the limits of 0–30° C. for a period of from 0.5 to 24 hours, whereby inter-reaction of said halide and said polymer takes place, and recovering said addition product from the resulting reaction mixture.

7. The process of claim 6 wherein said liquid polymer is polymerized 1,3-butadiene free from solid polymers, having a molecular weight within the limits of 500 to 4000.

8. A process comprising reacting a liquid polymer of 1,3-butadiene free from solid polymers, having a molecular weight within the limits of 500 to 4000, with tertiary butyl sulfenyl chloride, in proportions not exceeding 1 mole of said chloride per diene unit in said polymer, at a temperature within the limits of 0 to 30° C., for a reaction time of from 0.5 to 24 hours, and recovering a viscous liquid halide-polymer adduct from the resulting reaction mixture as a product of the process.

9. A process comprising introducing a solution of tertiary-butylsulfenyl chloride in a solvent selected from the group consisting of liquid paraffin hydrocarbons and chlorinated paraffin hydrocarbons, into admixture with a solution of a liquid polymer of 1,3-butadiene in a solvent selected from the group consisting of chlorinated paraffin hydrocarbons and glacial acetic acid, in proportions providing a resulting admixture containing not more than 1 mole tertiary-butylsulfenyl chloride per butadiene unit in said polymer; said sulfenyl chloride solution containing one mole of said tertiary-butylsulfenyl chloride per 100–1000 ml. of solution and said polymer solution containing 1 gram polymer per 2 to 10 grams of solution; said liquid polymer being free from solid polymers, and having a molecular weight within the limits of 500–4000; controlling the rate of introduction of said tertiary butylsulfenyl chloride solution to said polymer solution to maintain the resulting admixture at a temperature within the limits of 0 to 30° C., and thereafter maintaining the resulting admixture at said temperature, the total reaction time being within the limits of from 0.5 to 24 hours, whereby said tertiary butylsulfenyl chloride and said polymer react exothermically to form a tertiary-butylsulfenyl chloride-polymer adduct; recovering said adduct as a product of the process.

10. As a new composition, natural rubber incorporated with an adduct of a liquid polymeric material free from solid polymers and comprising a polymer of a conjugated diene containing from 4 to 6 carbon atoms in the molecule and a sulfenyl halide having a structural formula selected from the group consisting of R—S—X and R—S—S—X wherein in each said formula R is an alkyl radical containing not more than 16 carbon atoms and X is a halogen selected from the group consisting of Br and Cl, in an amount of said adduct sufficient to plasticize said rubber, said adduct containing said halide combined with said polymer in a proportion not greater than 1 mol for each diene unit.

11. The product of vulcanization of natural rubber which has been vulcanized with sulfur in the presence of an adduct of a liquid polymeric material free from solid polymers and comprising a polymer of a conjugated diene containing from 4 to 6 carbon atoms in the molecule and a sulfenyl halide having a structural formula selected from the group consisting of R—S—X and R—S—S—X wherein in each said formula R is an alkyl radical containing not more than 16 carbon atoms and X is a halogen selected from the group consisting of Br and Cl, in an amount of said adduct sufficient to plasticize said rubber, said adduct containing said halide combined with said polymer in a proportion not greater than 1 mol for each diene unit.

12. As a new composition, natural rubber incorporated with an adduct of tertiary-butylsulfenyl chloride and a liquid polymer of 1,3-butadiene free from solid polymers and having a molecular weight within the limits of 500 and 4000, in an amount of said adduct sufficient to plasticize said rubber, said adduct containing said chloride combined with said polymer in a proportion not greater than 1 mol for each diene unit.

13. A new composition of matter comprising the product of vulcanization of natural rubber which has been vulcanized with sulfur in the presence of an adduct of a liquid polymer of 1,3-butadiene free from solid polymers and having a molecular weight within the limits of 500 and 4000, and tertiary butylsulfenyl chloride, in an amount of said adduct sufficient to plasticize said rubber, said adduct containing said chloride combined with said polymer in a proportion not greater than 1 mol for each diene unit.

14. The process of claim 4 wherein said amount of sulfenyl halide per diene unit in said polymer is at least 0.02 mole.

15. The process of claim 8 wherein said proportion of tertiary butyl sulfenyl chloride per diene unit in said polymer is at least 0.05 mole.

16. As a new composition, the addition product of a liquid polymer free from solid polymers and comprising a polymer of a diene, and a halide characterized by a structural formula selected from the group consisting of R—S—X and R—S—S—X, wherein in each said formula R is an alkyl radical containing not more than 16 carbon atoms and X is a halogen selected from the group consisting of Br and Cl, said composition containing said halide in a proportion not exceeding one mol for each diene unit in said polymer.

17. A process comprising reacting a halide characterized by a structural formula selected from the group consisting of R—S—X and R—S—S—X, wherein in each said formula R is an alkyl radical containing not more than 16 carbon atoms and X is a halogen selected from the group consisting of Br and Cl, with a liquid polymeric material free from solid polymers and comprising a polymer of a diene, in an amount of said halide not exceeding one mol for each diene unit in said polymer to form a resulting halide-polymer addition product, and recovering said addition product.

18. As a new composition, a natural rubber incorporated with an adduct of a liquid polymeric material free from solid polymers and comprising a polymer of a diene and a halide characterized by a structural formula selected from the group consisting of R—S—X and R—S—S—X, wherein in each said formula R is an alkyl radical containing not more than 16 carbon atoms and X is a halogen selected from the group consisting of Br and Cl, in an amount of said adduct sufficient to plasticize said rubber.

19. The process of claim 9 wherein the said solvent for the tertiary butyl sulfenyl chloride is a liquid paraffin hydrocarbon containing from 5 to 6 carbon atoms in the molecule and wherein the said solvent for the said liquid polymer reactant is chloroform.

20. The process of claim 9 wherein the said solvent for the tertiary butyl sulfenyl chloride reactant is a paraffin hydrocarbon containing from 5 to 6 carbon atoms in the molecule and the said solvent for the liquid polymer reactant is glacial acetic acid.

References Cited in the file of this patent

UNITED STATES PATENTS

| | | |
|---|---|---|
| 2,338,829 | Werntz | Jan. 11, 1944 |
| 2,372,299 | Snow | Mar. 27, 1945 |
| 2,449,418 | Sharkey | Sept. 14, 1948 |
| 2,481,140 | Morris et al. | Sept. 6, 1949 |
| 2,483,499 | Lieber | Oct. 4, 1949 |